United States Patent
Hanel

(10) Patent No.: US 8,579,574 B2
(45) Date of Patent: Nov. 12, 2013

(54) STORAGE RACK WITH A MULTIPLICITY OF RACK UNITS

(75) Inventor: Joachim Hanel, Bad Friedrichshall (DE)

(73) Assignee: Hanel & Co., Altstätten (CH)

( * ) Notice: Subject to any disclaimer, the term of this patent is extended or adjusted under 35 U.S.C. 154(b) by 823 days.

(21) Appl. No.: 12/088,570

(22) PCT Filed: Sep. 21, 2006

(86) PCT No.: PCT/EP2006/066585
§ 371 (c)(1),
(2), (4) Date: Mar. 28, 2008

(87) PCT Pub. No.: WO2007/042381
PCT Pub. Date: Apr. 19, 2007

(65) Prior Publication Data
US 2008/0279669 A1   Nov. 13, 2008

(30) Foreign Application Priority Data

Oct. 10, 2005  (DE) .......................... 10 2005 048 379

(51) Int. Cl.
*B65G 1/00* (2006.01)

(52) U.S. Cl.
USPC .......................................... 414/267; 414/277

(58) Field of Classification Search
USPC ................................................ 414/267, 277
See application file for complete search history.

(56) References Cited

U.S. PATENT DOCUMENTS

| 4,049,142 A * | 9/1977 | Azzaroni ...................... 414/267 |
| 6,283,692 B1 * | 9/2001 | Perlov et al. .............. 414/222.01 |
| 6,619,902 B1 | 9/2003 | Castaldi et al. |
| 2005/0053450 A1 * | 3/2005 | Kantola et al. ................ 414/273 |

FOREIGN PATENT DOCUMENTS

| DE | 692 08 673 T2 | 10/1996 |
| DE | 692 04 055 T2 | 11/1996 |
| DE | 203 17 901 U1 | 3/2004 |
| EP | 0 722 894 B1 | 1/1996 |
| JP | 05-092294 U | 12/1993 |
| JP | 05-338716 | 12/1993 |
| JP | 06-067413 U | 9/1994 |
| JP | 10-305903 A | 11/1998 |
| JP | 2000-233807 | 8/2000 |
| WO | WO 2007/042381 A1 | 4/2007 |

* cited by examiner

*Primary Examiner* — Saul Rodriguez
*Assistant Examiner* — Willie Berry, Jr.
(74) *Attorney, Agent, or Firm* — Brian B. Shaw, Esq.; Thomas B. Ryan; Harter Secrest & Emery LLP

(57) ABSTRACT

A storage rack with a multiplicity of rack units includes a stack of interspaced supporting mounts, arranged paired at opposing sidewalls of the rack units in forming a storage location for a tote. The tote is designed for storage and retrieval in/from storage locations by an automated transfer apparatus. The transfer apparatus includes a first transfer assembly for travelling in a vertical direction and a second transfer assembly for travelling in a first horizontal direction supported by and relative to the first transfer assembly. To allow a simple adaptation of the storage rack to changes in the spatial situation, the first transport assembly includes a multiplicity of releasably interconnected modules, the number of which can be varied depending on the number of rack units.

18 Claims, 3 Drawing Sheets

STORAGE RACK WITH A MULTIPLICITY OF RACK UNITS

BACKGROUND OF THE INVENTION

1. Field of the Invention

The present invention relates to a storage rack with a multiplicity of rack units comprising a stack of interspaced supporting mounts, arranged paired at opposing sidewalls of the rack units in forming a storage location for a tote, the tote being designed for storage and retrieval in/from storage locations by means of an automated transfer apparatus. The transfer apparatus comprises at least one first transfer means for travelling in the vertical direction and a second transfer means for travelling in a first horizontal direction supported by and relative to the first transfer means.

2. Description of Related Art

Known from EP 0 722 894 B1 is a storage rack comprising two interspaced rack units, between which a transfer apparatus is provided, by which a tote can be travelled vertically. Each rack unit features sidewalls oriented parallel to each other, defined at interspaced vertical rack stanchions. Provided at the sidewalls is a multiplicity of stacked and interspaced supporting mounts to form storage locations for the totes. The supporting mounts are configured as supporting ledges integrated and moulded in the sidewalls. Provided at one end of a rack unit is a removal aperture through which the tote can be shifted into the region of the transfer apparatus. Once the tote is on the transfer apparatus it can be vertically travelled to the desired level. After having attained the target level the tote is transversed into its final storage location.

Prior art storage racks in accordance with the preamble of claim 1 are furthermore known in which a multiplicity of rack units are arranged juxtaposed and the totes can be travelled in all three spatial directions by means of a transfer apparatus comprising a first transfer means for vertical travel featuring a horizontal cross-supporting member. A second transfer means is supported by the first transfer means, relative to which it can be travelled in a first horizontal direction.

SUMMARY OF THE INVENTION

The invention is based on the object of defining a storage rack which can now be simply adapted to changes in the spatial situation.

To achieve this object a storage rack having the aforementioned features as set forth in claim 1 is characterized in that in accordance with the invention the first transfer means consists of a multiplicity of releasably interconnected modules, the number of which can be varied depending on the number of rack units.

The storage rack in accordance with the invention is based on having discovered that by engineering a first transfer means modular, a storage rack is now achievable which can be extended or reduced in length to thus permit adapting the storage rack to changes in the spatial situation by simple ways and means.

Advantageous aspects of the storage rack in accordance with the invention read from the dependent claims.

To advantage, the first transfer means comprises at least one supporting member extending in the first horizontal direction (X) consisting of a multiplicity of member modules. The member modules are advantageously bolted to each other. Thus adapting the supporting member to the change in the number of rack units by simple ways and means is facilitated.

In an advantageous aspect the first transfer means comprises at least one biasing member consisting of a multiplicity of biasing modules and at least one tension lock. By means of such biasing, large spans can be attained for the first transfer means. By means of the biasing modules the biasing member can be simply adapted to changes in length of the supporting members.

It is furthermore of advantage when the biasing member runs at least portionally spaced away from the supporting member of the first transfer means. Such an external bias in which the biasing member is arranged mostly outside of the supporting member cross-section exerts due to the lever formed by the spacing from the supporting member a compression force which can result in overcompression of the tension zone of the supporting member.

In a further advantageous embodiment the second transfer means can be travelled by means of a rack and pinion drive comprising at least one gear rack consisting of a multiplicity of gear rack modules. Thus the output of the gear rack is enabled to be simply adapted to changes in the number of rack units.

Advantageously the first transfer means can be travelled by means of a chain drive comprising at least one drive shaft, the length of which is adapted to the width of the storage rack. To adapt to a change in length of the storage rack drive shafts differing in length are employed.

In one advantageous aspect the multiplicity of rack units consists of interspaced rack end modules between which rack intermediate modules are arranged. By adding or removing rack intermediate modules between the remaining rack end modules, varying the length of the storage rack is made easy.

In an advantageous further embodiment the second transfer means is guided by wheels on the first transfer means.

To advantage, the second transfer means features a carrier plate mounted on a carriage relative to which it can be travelled in a second horizontal direction (Y). Travelling the carrier plate of the second horizontal direction (Y) ensures reliable storage and retrieval of the totes.

To minimize vibrations possibly occurring in movement of the transfer means the first transfer means is guided to advantage by means of at least one wheel on at least one rack unit.

To achieve a rigid design of the sidewalls the supporting mounts are impressed snaked into the sidewalls. The sidewalls are made in particular of sheet steel and expediently welded to vertical stanchions.

It is furthermore of advantage when in the region of the bayway a height sensor is provided to sense the height of the articles. The height sensor establishes the number of the height units needed to store the articles. The sensing signal of the height sensor is communicated to a transfer controller which as a function of the assignment of the storage rack and the height of the article concerned travels the tote to a suitable storage location and stores it there.

BRIEF DESCRIPTION OF THE SEVERAL VIEWS OF THE DRAWING(S)

The invention will now be detailed with reference to the diagrammatic FIGs. of the drawings in which FIG. 1 is a view in perspective of the storage rack in accordance with the invention with a transfer apparatus;

DETAILED DESCRIPTION OF THE INVENTION

Figure 1:
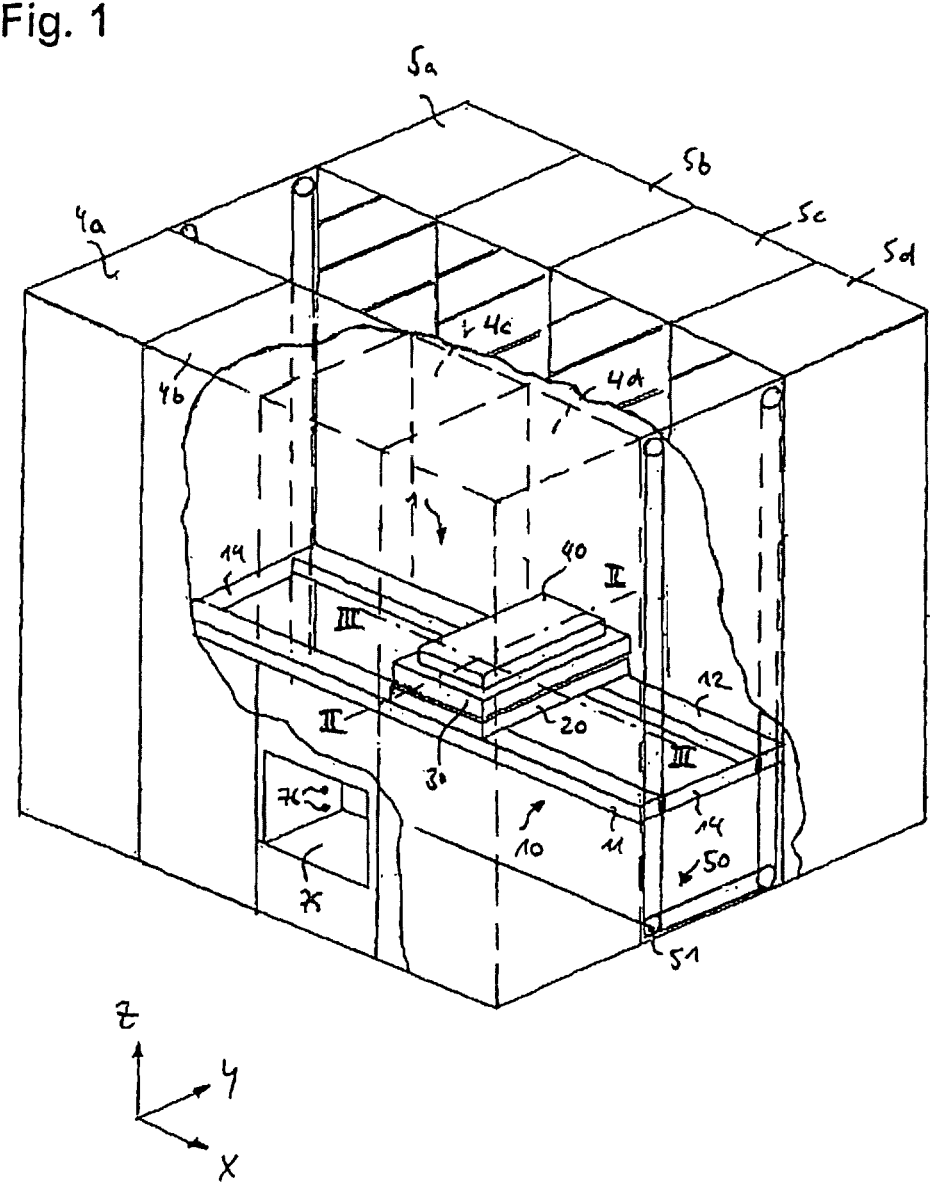

Referring now to FIG. 1 there is illustrated diagrammatically the configuration of a storage rack in accordance with the invention with eight rack units 4, 5, of which four rack units 4a, 4b, 4c, 4d are arranged juxtaposed in a first row and a further four rack units 5a, 5b, 5c, 5d are arranged juxtaposed in a second row. Sited between the two rows is a transfer apparatus 1 for the totes 40. Provided in each of the rack units 4, 5 is a multiplicity of stacked storage locations 3 for receiving articles 2 stored on totes 40.

To store the totes 40 in the individual storage locations 3 the rack units 4, 5 feature sidewalls 70 having pairs of opposed supporting mounts 72. The sidewalls 70 made of sheet steel are each welded to stanchions 71, preferably by means of projection welding.

Figure 3:
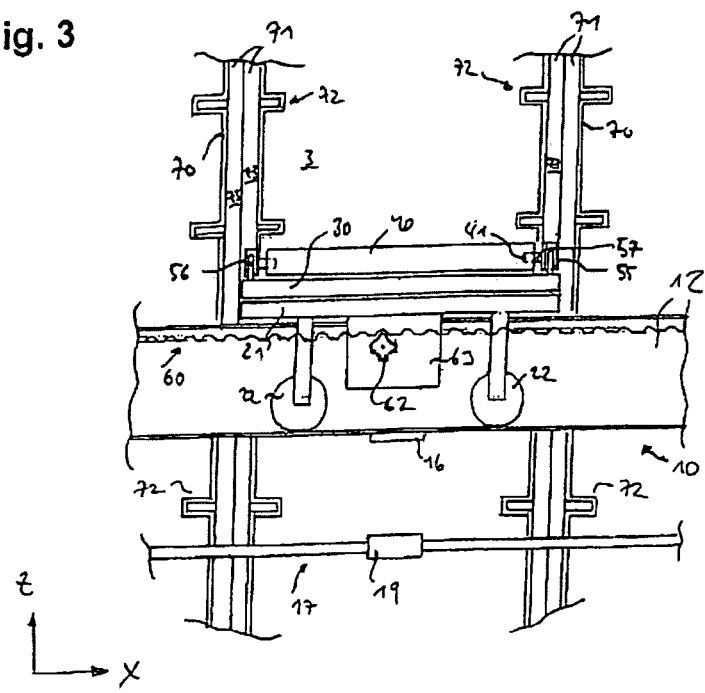
FIG. 3 is a cross-section taken along the line III-III in FIG. 1 through the transfer apparatus.

Referring now to FIG. 3 there is illustrated how the supporting mounts 72 are connected to each sidewall 70 as an integrated snaked impression or recess in each sidewall. This ensures a relatively rigid configuration of the sidewalls 70. To achieve facilitated storage of the totes 40 in the storage locations 3 the supporting mounts 72 feature a tapered cross-section (not shown) at the side facing the transfer apparatus 1.

Referring again to FIG. 1 there is illustrated how a bayway 75 permits storing and retrieving the totes 40 in/from the storage rack. To optimize available storage location space a height sensor 76 is provided in the region of the bayway 75 to sense the height of the articles 2. The height sensor 76 features a multiplicity of photocell switches interspaced in accordance with the stack spacing of the supporting mounts 72 so that the number of height units needed for storing the articles 2 can be determined.

A controller determines one or more suitable storage locations 3 and directs the totes 40 to the storage locations 3 as predetermined by the controller.

For transfer of the totes 40 the transfer apparatus 1 is engineered so that the totes 40 can be travelled in a first spatial direction Z, in a second spatial direction X and in a third spatial direction Y. The three spatial directions X, Y, Z are oriented at right angles to each other in the present example aspect. In the following, the spatial direction Z is also termed the vertical direction, the spatial direction X also termed the longitudinal direction and the spatial direction Y is also termed the transverse direction.

Figure 4:
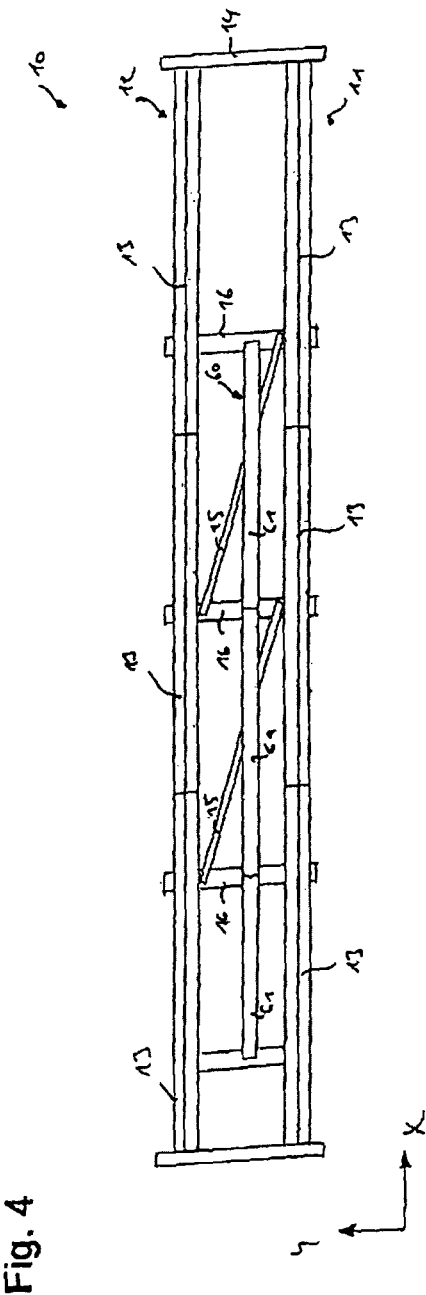
FIG. 4 is a top-down view of the first transfer means.
Figure 5:
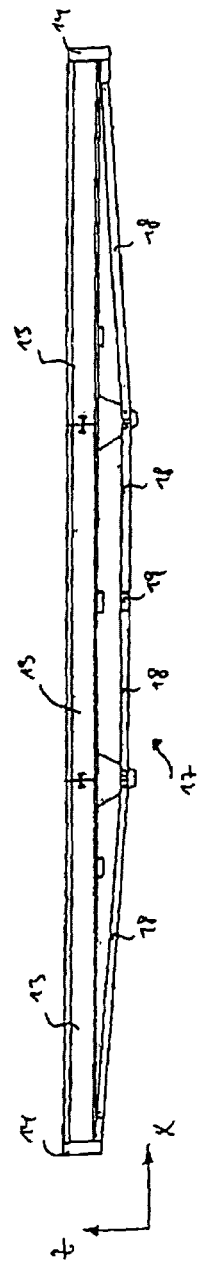
FIG. 5 is a side view of the first transfer means of the transfer apparatus.

To locate the totes 40 in the vertical direction, longitudinal direction and transverse direction the transfer apparatus 1 comprises a first transfer means 10 and a second transfer means 20. The first transfer means 10 is travelled by means of a first drive in the first vertical direction Z and comprises two supporting members 11, 12 oriented parallel to each other. As evident from FIGS. 4 and 5 each supporting member 11, 12 is composed of three supporting member modules 13 each bolted to the other. This results in a releasable connection between the supporting member modules 13.

The first transfer means 10 comprises two biasing members 17 extending at the underside of the supporting members 11, 12. Each biasing member 17 comprises four biasing modules 18 in the form of tie rods. In the middle portion of the biasing member 17 a tension lock 19 is provided for regulating the bias generated by the biasing member 17. However, adjusting the tension can also be done additionally or alternatively in end portions of the end modules of the biasing member 17.

The biasing member 17 is oriented in the middle portion spaced away from the supporting member 11, 12. This results from the lever arm in a torque being generated acting contrary to the torque generated by the dead weight of the transfer apparatus 1 and the totes 40 including the articles 2. This results in a reduction in the bending of the supporting member 11, 12 in thus permitting a higher loading capacity of the supporting member 11, 12 as compared to a supporting member 11, 12 without a biasing member 17.

In assembling the supporting members 11, 12 the individual supporting member modules 13 are bolted together, at each joint of the supporting member modules 13 a connecting arm 31 being arranged at the underside of the supporting members 11, 12. At the end portion of the connecting arm 31 the biasing member 17 is defined spaced away from the supporting member 11, 12. Furthermore, the first transfer means 10 features two inclined stiffeners 15 and two cross-members 14 provided in the end portions of the supporting members 11, 12.

Referring still to FIG. 1 there is illustrated furthermore how the first transfer means 10 is fitted with a drive comprising a total of four chain drives each comprising a chain 50 and two drive shafts 51 jutting out horizontally from a drive motor (not shown). To adapt the drive to the change in length of the storage rack, drive shafts 51 differing in length find application.

To avoid pivoting of the supporting members 11, 12 in the transverse direction Y during movement of the first transfer means 10, a multiplicity of wheels 74 is provided at the supporting members 11, 12 and at the struts 16 which run on the vertical supporting members of the rack units 4, 5.

Figure 2:
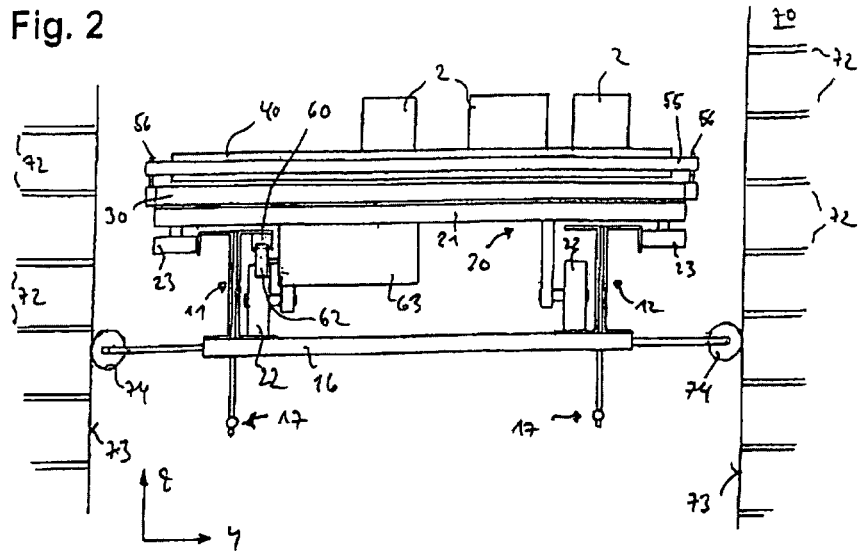
FIG. 2 is a cross-section taken along the line II-II in FIG. 1 through the transfer apparatus.

As evident from FIGS. 1 to 3, the second transfer means 20 comprises a carriage 21 supporting the carrier plate 30. To achieve location of the second transfer means 20 in the first spatial direction X a rack and pinion drive and a multiplicity of wheels 22 are provided supported by the first transfer means 10.

The rack and pinion drive comprises a gear rack 60 formed by a multiplicity of gear rack modules 61, a pinion 62 mating with the gear rack 60 and a motor 63 for powering the pinion 62. The module configuration of the gear rack 60 also enables this to be adapted to changes in length of a first transfer means 10. The gear rack modules 61 are mounted on the struts 16 of the first transfer means 10. The pinion 62 and motor 63 are mounted on the carriage 21 so that the teeth of the pinion 62 can mate with the teeth of the gear rack 60.

Serving guidance of the second transfer means 20 are, for one thing, the wheels 22 rotating about an axis oriented parallel to the transverse direction Y and provided for location on the flange of the supporting member 11, 12. For another, additional wheels 23 mate with the vertical oriented flanges of the supporting member 11, 12, rotating about an axis oriented parallel to the vertical direction Z in serving for lateral guidance of the carriage 21 at the supporting members 11, 12.

The carrier plate 30 is located on the carriage 21 so that it can travel together with the totes 40 located thereon in the second spatial direction Y. To make this possible a gear drive (not shown) is in turn preferably provided. The motor for powering this gear may be fitted besides the motor 63 also on the underside of the carriage 21 as shown in FIG. 3, for example.

In the example aspect as presently explained it is provided for that the carrier plate 30 can be travelled relative to the carriage 21 by a relatively short distance in the second spatial direction Y. This serves substantially to travel the carrier plate 30 from the region of the stored totes 40 (see FIG. 2). In accordance with the example aspect the carrier plate 30 is travelled by a distance of approximately 40 to 50 mm in the second spatial direction Y. Alternatively, this distance can also be much greater, however.

To convey the tote 40 to the predefined storage location 3 the carrier plate 30 is provided with two chain drives, each comprising a chain 55 and two drive shafts 56. In this arrangement the chains 55 are arranged upright, i.e. the drive shafts 56 rotate about an axis oriented parallel to the vertical direction Z. Each chain 55 features a driving dog 57 engaging each recess 41 in the tote 40. When the driving dogs 57 engage the recesses 41 the tote 40 can then be moved with the aid of the chain drive and a slider guide on the carrier plate 30 (not shown) in the second spatial direction Y so that the totes 40 come to rest on a pair of supporting mounts 72.

The embodiment as described is characterized particularly in that by inserting or removing rack intermediate modules 4*b*, 4*c*, 5*b*, 5*c* the storage rack is now variable in the longitudinal direction X for facilitated adaptation to changes in the spatial situation. This is made possible particularly by the modular configuration of the first transfer means 10. To adapt the storage rack to a change in the number of rack units 4, 5 the length of the supporting members 11, 12 can now be simply varied by means of the supporting member modules 13. Furthermore, the biasing member 17 and the gear rack 60 can also be varied in length due to their modular configuration. Adapting the drive shafts 51 is achieved by drive shafts 51 differing in length.

It is emphasized that the example aspect as described merely represents just one possible embodiment and that further embodiments are just as possible by selecting the individual components, particularly of the transfer apparatus.

LIST OF REFERENCE NUMERALS 1 transfer apparatus
2 articles
3 storage location
4 rack unit
5 rack unit
10 first transfer means
11 supporting member
12 supporting member
13 supporting member module
14 crossmember
15 stiffener
16 strut
17 biasing member
18 biasing module
19 tension lock
20 second transfer means
21 carriage
22 wheel
23 wheel
30 carrier plate
31 connecting arm
40 tote
41 recess
50 chain
51 drive shaft
55 chain
56 drive shaft
57 driving dog
60 gear rack
61 gear rack module
62 pinion
63 motor
70 sidewall
71 stanchion
72 supporting mounts
73 end face
74 wheel
75 bayway
76 height sensor
Z vertical direction
X first horizontal direction/longitudinal direction
Y second horizontal direction/transverse direction

The invention claimed is:

1. A modular storage rack comprising:
(a) a plurality of rack units disposed side-by-side in a row;
(b) each of the rack units comprising a stack of interspaced supporting mounts arranged paired at opposing sidewalls of each of the rack units to form a plurality of vertically arranged storage locations for a tote;
(c) the number of rack units in the row being adjustable for varying the number of storage locations in the storage rack;
(d) an automated transfer apparatus for selectively storing and retrieving the tote in/from the storage locations, the automated transfer apparatus comprising a modular transfer assembly that travels in a first, vertical direction and a carriage disposed on the modular transfer assembly and that travels along the modular transfer assembly in a second, horizontal direction parallel to the row of rack units;
(e) the modular transfer assembly including at least one supporting member assembled from a plurality of releasably interconnected supporting modules that are connected to one another in a series for extending the at least one supporting member in the second, horizontal direction parallel to the row of rack units so that the carriage is supported for traveling along the modular transfer assembly into a series of positions for accessing the storage locations along the row of rack units; and
(f) the number of supporting modules being variable depending upon the adjustable number of the rack units in the row.

2. The storage rack as set forth in claim 1, wherein the at least one supporting member comprises two supporting members extending in the second, horizontal direction and the two supporting members being assembled from the releasably interconnected supporting modules.

3. The storage rack as set forth in claim 2, wherein the modular transfer assembly comprises at least one biasing member extending in the second, horizontal direction and assembled from a plurality of biasing modules and at least one tension lock, wherein the number of biasing modules is variable depending upon the number of supporting modules.

4. The storage rack as set forth in claim 3, wherein a portion of the biasing member is spaced from the two supporting members of the modular transfer assembly in the first, vertical direction.

5. The storage rack as set forth in claim 1, wherein the carriage is moved using a rack and pinion drive comprising at least one gear rack assembled from a plurality of gear rack modules extending in the second, horizontal direction, wherein the number of gear rack modules is variable depending upon the number of supporting modules.

6. The storage rack as set forth in claim 1, wherein the modular transfer assembly is moved in the first, vertical direction together with the carriage disposed on the modular transfer assembly using a chain drive comprising at least one drive shaft.

7. The storage rack as set forth in claim 1, wherein the plurality of rack units includes interspaced rack end units between which rack intermediate units are arranged, and wherein the at least one supporting member is assembled from a sufficient number of the releasably interconnected supporting modules to span a distance in the second, horizontal direction between the rack end units.

8. The storage rack as set forth in claim 1, wherein the at least one supporting member includes at least one flange extending in the second, horizontal direction and the carriage is guided by wheels in engagement with the at least one flange on the modular transfer assembly.

9. The storage rack as set forth in claim 1, further comprising a carrier plate mounted on the carriage and movable in a third, horizontal direction that is normal to the second, horizontal direction for moving the tote into and out of the storage locations.

10. The storage rack as set forth in claim 1, wherein the modular transfer assembly is guided for travel in the first, vertical direction by means of at least one wheel on a vertical strut of at least one rack unit.

11. The storage rack as set forth in claim 1, wherein the supporting mounts project from the sidewalls of the rack units and extend in a third, horizontal direction that is normal to the second, horizontal direction.

12. The storage rack as set forth in claim 1, further comprising at least one bayway for storage and retrieval of the tote from the storage rack; wherein the bayway is provided with a height sensor to sense the height of articles associated with the tote.

13. A modular storage rack with a of plurality rack units comprising:
(a) each of the rack units including a stack of interspaced supporting mounts, arranged paired at opposing sidewalls of the rack units to form a set of storage locations for a tote;
(b) the rack units being disposed side-by-side in a row having a longitudinal length;
(c) the number of rack units in the row being adjustable for varying the number of storage locations in the storage rack;
(d) an automated transfer apparatus for selectively storing and retrieving the tote in/from the storage locations, the automated transfer apparatus comprising a modular transfer assembly that travels in a first, vertical direction and a carriage disposed on the modular transfer assembly and that travels along the modular transfer assembly in a second, horizontal direction parallel to the row of rack units,
(e) the modular transfer assembly including at least one supporting member assembled from a plurality of releasably interconnected supporting modules that are connected to one another in a series for extending the at least one supporting member in the second, horizontal direction parallel to the row of rack units so that the carriage is supported for traveling along the modular transfer assembly into a series of positions for accessing the storage locations along the row of rack units;
(f) the number of supporting modules being variable depending upon the adjustable number of the rack units in the row; and
(g) the at least one supporting member of the modular transfer assembly having a horizontal dimension corresponding to the longitudinal length of the row of rack units.

14. A modular storage rack with a plurality of rack units comprising:
(a) a first row of rack units having first openings;
(b) a second row of rack units spaced from the first row of rack units and having second openings facing the first openings;
(c) the space between the first row of rack units and the second row of rack units comprising a shaft and the first and second openings being accessible from within the shaft,
(d) each of the rack units including a stack of interspaced supporting mounts, arranged paired at opposing sidewalls of the rack units to form storage locations for a tote;
(e) the number of rack units in each of the first and second rows being adjustable for varying the number of storage locations in the storage rack;
(f) an automated transfer apparatus disposed in the shaft between the first and second rows of rack units to access the first openings of the first row of rack units on one side of the shaft and the second openings of the second row of rack units on an opposite side of the shaft, the automated transfer apparatus providing for selectively storing and retrieving the tote in/from the storage locations through the first and second openings, the automated transfer apparatus comprising a modular transfer assembly that travels within the shaft in a first, vertical direction and a carriage disposed on the modular transfer assembly that travels within the shaft along the modular transfer assembly in a second, horizontal direction parallel to the first and second rows of rack units;
(g) the modular transfer assembly including at least one supporting member assembled from a plurality of releasably interconnected supporting modules that are connected to one another in a series for extending the at least one supporting member in the second, horizontal direction parallel to the first and second rows of rack units so that the carriage is supported for traveling along the modular transfer assembly into a series of positions for accessing the storage locations along the first and second rows of rack units; and
(h) the number of supporting modules being variable depending upon the adjustable number of the rack units in at least one of the first and second rows of rack units.

15. The storage rack of claim 14 further comprising:
a bayway in one of the rack units of the first row, the bayway comprising an opening through which a user inputs totes into and removes totes from the storage rack, wherein the bayway opening is accessible to the user from outside the storage rack and the first and second openings that are accessible from within the shaft are not accessible to the user from outside the storage rack.

16. The storage rack of claim 15, further comprising a height sensor disposed in the bayway.

17. The storage rack of claim 15, wherein each row of rack units has a longitudinal length along the shaft, and the at least one supporting member of the modular transfer assembly has a longitudinal dimension substantially the same as the longitudinal length of at least one of the first and second rows of rack units.

18. The storage rack of claim 15, further comprising a carrier plate that is disposed on the carrier and movable in a third, horizontal direction that is normal to the second, horizontal direction to extend into the storage locations through the first and second openings that are accessible from within the shaft.

* * * * *

UNITED STATES PATENT AND TRADEMARK OFFICE
CERTIFICATE OF CORRECTION

PATENT NO.        : 8,579,574 B2
APPLICATION NO.   : 12/088570
DATED             : November 12, 2013
INVENTOR(S)       : Joachim Hänel It is certified that error appears in the above-identified patent and that said Letters Patent is hereby corrected as shown below:

On the Title Page

Item (12), "Hanel" should read --Hänel--.

Item (75), please change the family name of the inventor from "Hanel" to --Hänel--.

Item (73), please change the name of the assignee from "Hanel & Co." to --Hänel & Co.--.

Signed and Sealed this
Twenty-second Day of April, 2014

Michelle K. Lee
*Deputy Director of the United States Patent and Trademark Office*